United States Patent
Kniel

[15] 3,696,162
[45] Oct. 3, 1972

[54] AQUEOUS AMINE ACID GAS ABSORPTION

[72] Inventor: Ludwig Kniel, Scarsdale, N.Y.

[73] Assignee: The Lummus Company, Bloomfield, N.J.

[22] Filed: May 26, 1971

[21] Appl. No.: 146,915

Related U.S. Application Data

[63] Continuation-in-part of Ser. No. 768,303, Oct. 17, 1968, Pat. No. 3,598,881.

[52] U.S. Cl..................260/677 A, 260/681.5, 23/3
[51] Int. Cl..............................................C07c 11/02
[58] Field of Search..........260/677 A, 681.5, 683.00; 23/3

[56] References Cited

UNITED STATES PATENTS

| | | | |
|---|---|---|---|
| 3,233,004 | 2/1966 | Hirchbeck et al. | 260/677 |
| 2,527,951 | 10/1950 | Mayland et al. | 260/677 |
| 3,390,075 | 6/1968 | Harper | 208/341 |
| 3,228,874 | 1/1966 | Morgan | 208/236 |
| 2,487,577 | 11/1949 | Stanley | 23/3 |
| 1,986,228 | 1/1935 | Sequy | 208/236 |
| 2,301,588 | 11/1942 | Schultz et al. | 208/236 |
| 3,098,705 | 7/1963 | Bally | 23/3 |
| 2,970,177 | 1/1961 | Cobb | 260/677 |
| 3,284,339 | 11/1966 | Begley et al. | 208/87 |
| 3,598,881 | 8/1971 | Kniel et al. | 260/683 |

Primary Examiner—Delbert E. Gantz
Assistant Examiner—J. Nelson
Attorney—Marn and Jangarathis

[57] ABSTRACT

Acid gases are removed from a gaseous stream containing the acid gases and also dienes by contact with a mixture of a lean aqueous amine acid gas absorption solution and a hydrocarbon solvent free of olefinic unsaturation. The use of such a mixture prevents the problems encountered in the amine regeneration system as a result of dienes being carried into the system.

8 Claims, 1 Drawing Figure

PATENTED OCT 3 1972 3,696,162
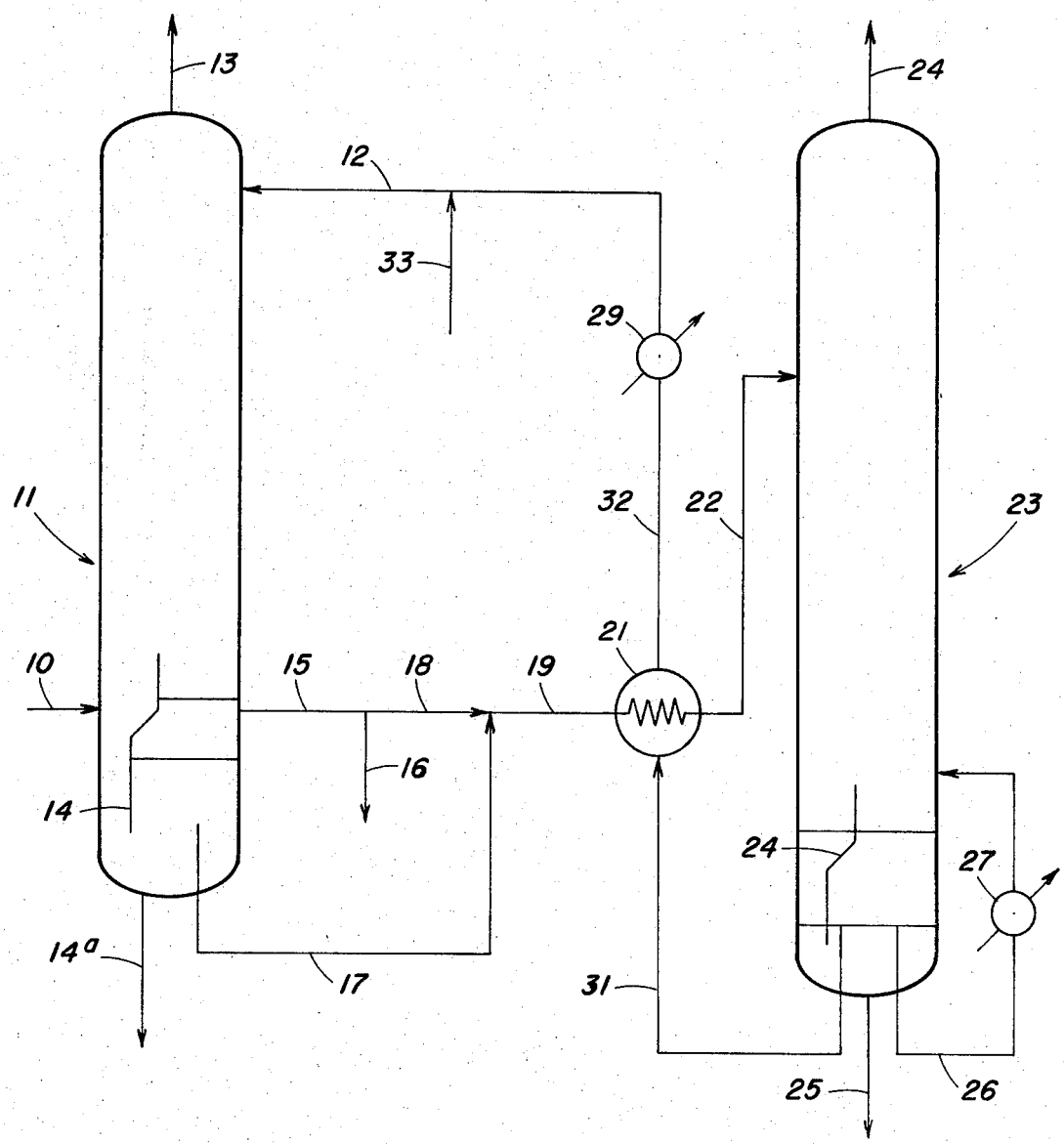
INVENTOR
Ludwig Kniel
BY *Marn & Jangarathis*
ATTORNEYS

AQUEOUS AMINE ACID GAS ABSORPTION

This application is a continuation-in-part of Application Ser. No. 768,303, filed on Oct. 17, 1968 now U.S. Pat. No. 3,598,881.

This invention relates to an improved process for removing acid gases from a hydrocarbon effluent containing dienes.

In the pyrolysis of ethane, propane, naphtha, gas oil and other suitable feed stocks for the production of olefins, the effluent gas contains acid gases, such as carbon dioxide, hydrogen sulfide and traces of carbonyl sulfide, in addition to diolefinic compounds such as propadiene, butadiene, cyclopentadiene and the like. In the purification of such pyrolysis effluent gases for the eventual recovery of desired products, such as, ethylene, propylene and the like, the acid gases are generally first removed from the gaseous effluent by contacting the effluent in an absorption tower with a suitable solvent, such as an aqueous amine solution. The aqueous amine solution, now containing acid gases, is withdrawn from the absorption tower and introduced into a regenerator wherein the aqueous solution is heated to drive off the acid gases. The aqueous amine solution, essentially free of acid gases, is then recycled to the absorption tower.

It has now been found that serious polymerization problems are encountered in the amine regenerator and heat exchange system which are caused by the heat sensitive dienes present in the pyrolysis effluent gas being carried into the amine absorption system. The dienes, although well below their respective dew points in the pyrolysis effluent gas, are believed to be carried into the amine absorption system by one or all of the following mechanisms:

1. The pyrolysis effluent gas prior to being introduced into the amine absorption solution is generally passed through a cooling stage wherein the heaviest hydrocarbons are partially condensed. As a result, the pyrolysis effluent gas carries a fine mist of liquid particles of dew point composition that are in phase equilibrium with the non-condensed phase and consequently contain equilibrium amounts of dienes. The liquid particles, containing the dienes, are withdrawn from the absorption tower with the aqueous amine solution.

2. The contacting of the gaseous pyrolysis effluent in the absorption tower with the aqueous amine solution condenses some heavier hydrocarbons which are saturated with dienes.

3. The dienes are slightly soluble in aqueous amine solutions; i.e., in the order of 0.05–0.3 weight percent.

In copending U.S. Application Ser. No. 768,303 now U.S. Pat. No. 3,598,881, it was proposed to mix the aqueous amine absorption solution from the amine absorber with a hydrocarbon solvent to absorb the dienes, and then separate the hydrocarbon solvent, containing the absorbed amine from the aqueous amine absorption solution prior to introduction thereof into the amine regenerator. It has recently been found, however, that the use of such an expedient did not provide an improvement which was sufficient enough for the desired sustained operation of the regeneration system.

An object of this invention is to provide an improved process for separating acid gases from a gaseous hydrocarbon containing dienes and acid gases.

A further object of this invention is to provide an amine absorption system for removing acid gases from a hydrocarbon effluent, containing acid gases and dienes, which avoids polymerization difficulties in the system.

Yet another object of this invention is to provide an improved process for removing acid gases from an effluent from a hydrocarbon pyrolysis process, particularly a pyrolysis process for producing ethylene.

These and other objects of the invention should be readily apparent from the following detailed description thereof when read with reference to the accompanying drawing, wherein:

The drawing is a simplified schematic flow diagram of one embodiment of the invention.

The objects of this invention are broadly accomplished by introducing a hydrocarbon solvent with the aqueous amine introduced into the acid gas absorber to both absorb dienes introduced into the amine absorber with the acid gas-containing feed and to act as a solvent for any complexes formed from the dienes and acid gas anions.

In accordance with the invention, the hydrocarbon solvent and aqueous amine are introduced into the acid gas absorber and contact the acid gas feed, such as a gaseous hydrocarbon feed obtained from the pyrolysis of a hydrocarbon such as ethane, propane, naphtha, gas oil or the like, to scrub acid gases, such as carbon dioxide and/or hydrogen sulfide, from the gaseous feed. The dienes and any complexes produced therefrom, as hereinafter described, are absorbed by the hydrocarbon solvent, and a portion of the hydrocarbon solvent is purged from the system to prevent a build-up of such components.

It has been found that the presence of the hydrocarbon solvent in the amine absorber significantly improves the operation of the system. Although applicant does not intend to be limited by any theoretical reasoning, it is believed that the dienes present in the feed to the amine absorber may react in the absorber with the anions of the acid gas, resulting in the production of hydrocarbon complexes, such as alkylthioalkenes and some polysulfides. It is believed that the presence of the hydrocarbon solvent in the absorber aids in slowing down the formation of such complexes, and also functions as a solvent for such complexes.

The hydrocarbon solvent employed in the process is one which is essentially free of olefinically unsaturated components, and one which has an initial boiling point high enough to prevent any appreciable amounts thereof from being vaporized and lost in the amine absorption system, generally an initial boiling point of at least about 80° C., and preferably an initial boiling point of at least about 160° C. In addition, in order to facilitate recovery of hydrocarbon solvent, the hydrocarbon solvent should preferably not form azeotropes with the dienes generally present in the pyrolysis effluent. The hydrocarbon solvent may contain one or more components and may be aromatic or non-aromatic, with an aromatic solvent being preferred, although good results are also obtained with non-aromatic hydrocarbons, such as, a low molecular weight naphtha.

The hydrocarbon solvent is added to the aqueous amine absorption solution in an amount to provide from about 2 percent to about 10 percent, by weight, of the hydrocarbon solvent, and preferably from about 5 percent to about 8 percent, by weight, of the hydrocarbon solvent.

In accordance with a preferred procedure of the invention, the hydrocarbon solvent is circulated to the amine regenerator with the aqueous amine solution, with the aqueous amine solution and hydrocarbon being recovered from the amine regenerator and recycled to the amine absorber. It has been found that the presence of the hydrocarbon solvent in the amine regenerator significantly aids in the prevention of the problems heretofore encountered in the regenerator.

The invention will be further described with respect to an embodiment thereof illustrated in the accompanying drawing, but it is to be understood that the scope of the invention is not to be limited thereby.

Referring now to the drawing, a gaseous hydrocarbon in line 10, such as an effluent obtained from the pyrolysis of ethane, containing acid gases and dienes as impurities, is introduced into an absorption tower 11, containing suitable gas-liquid contacting devices, to effect removal of acid gases. The amine absorber is generally operated at a temperature from about 20° C. to about 50° C. and a pressure from about 5 atm. to about 30 atm. A mixture of an aqueous amine solution, such as an aqueous solution of monoethanolamine, and a hydrocarbon solvent, preferably an aromatic hydrocarbon solvent, free of olefinically unsaturated components is introduced into absorption tower 11 through line 12 and countercurrently contacts the hydrocarbon gas. As a result of such contact, acid gases are absorbed by the aqueous amine solution and in addition, dienes contained in the gaseous hydrocarbon effluent and any complexes resulting from reaction between dienes and acid gases are absorbed by the hydrocarbon solvent. An acid gas free hydrocarbon is withdrawn from absorption tower 11 through line 13.

The bottom of absorption tower 11 is preferably provided with a baffle 14 to create a relatively quiescent zone in the bottom of the absorber 11. It has been found that some heavy polymer is formed in the system, and in order to prevent circulation of such polymer, a quiescent zone is provided in the bottom of the tower 11 to promote settling of the polymer. The settled polymer may be withdrawn from the absorber through line 14.

An aqueous amine phase and a lighter hydrocarbon solvent phase, containing absorbed dienes and complexes, are formed in the bottom of the absorber 11, and hydrocarbon solvent is withdrawn from the absorber 11 through line 15. A portion of the hydrocarbon solvent in the line 15 is purged from the system through line 16 (generally from about 1 percent to about 5 percent, by weight, of the hydrocarbon solvent flowing in the system) to prevent a buildup of dienes and complexes. The purged portion may be passed to a suitable fractionator to recover the hydrocarbon solvent.

Rich aqueous amine is withdrawn form the bottom of the absorber 11 through line 17 which extends into the aqueous amine phase therein, to thereby prevent heavy polymer which settles in the absorber from entering line 17, and is combined with the hydrocarbon solvent remaining in line 18. The flow rates of the hydrocarbon solvent and aqueous amine are proportioned to provide the desired proportions of aqueous amine and hydrocarbon solvent.

The combined mixture of aqueous amine and hydrocarbon solvent in line 19 is passed through heat exchanger 21 to effect heating thereof by indirect heat transfer with the regenerated amine solution and hydrocarbon solvent withdrawn from the amine regenerator. The heated mixture in line 22 is introduced into an amine regenerator 23 of type known in the art, generally operated at a temperature from about 110° C. to about 130° C. and a pressure from about 0.1 atm. to about 1.0 atm. to separate the acid gases therefrom. An acid gas overhead is withdrawn from the regenerator 23 through line 24.

The bottom of regenerator 23, as a precaution, is provided with a baffle 24a to create a relatively quiescent zone in the bottom of the regenerator 23 to thereby promote settling of any polymer formed therein and prevent such polymer from entering the regeneration reboiler. Any settled polymer may be withdrawn from the regenerator 23 through line 25.

A portion of the bottoms of the amine regenerator 23 is withdrawn through line 26, which is positioned at the hydrocarbon solvent-aqueous amine interface, and passed through reboiler 27 to provide heat requirements for the regenerator. Lean aqueous amine and hydrocarbon solvent are withdrawn from amine regenerator 23 through line 31, positioned at or just below the hydrocarbon solvent-aqueous amine interface, and is passed through heat exchanger 21 wherein the lean aqueous amine and hydrocarbon solvent are cooled by indirect heat transfer with the feed to regenerator 23. The cooled mixture in line 32 is further cooled in exchanger 29, combined with make-up hydrocarbon solvent in line 33 and the mixture in line 12 introduced into absorber 11.

It should be apparent that numerous modifications of the hereinabove described embodiment are possible within the spirit and scope of the invention. Thus, for example, the hydrocarbon solvent need not be circulated to the regenerator, although such a procedure is preferred. In such a case, the hydrocarbon solvent separated in the absorber would be combined with the lean absorption solution being passed to the absorber instead of with the rich absorption solution being passed to the regenerator, as particularly shown.

As a further modification, the aqueous amine and hydrocarbon solvent need not be withdrawn separately from the absorber, but instead may be withdrawn together as described with reference to the regenerator. In such a modification, however, a portion of the hydrocarbon solvent would eventually be separated from the aqueous amine in order to provide a purge stream. Similarly, the hydrocarbon solvent and aqueous amine could be withdrawn separately from the regenerator and subsequently combined instead of being withdrawn together as particularly described. The portion of hydrocarbon to be purged would be obtained from the hydrocarbon solvent stream separately withdrawn from the regenerator.

As a further modification, the hydrocarbon purge may be effected at a point in the system other than the one particularly shown; e.g., the hydrocarbon solvent may be purged from the regenerator.

These modifications and others should be apparent to those skilled in the art from the teachings herein.

This invention is further illustrated by the following example, but the scope of the invention is not to be limited thereby.

EXAMPLE

A lean aqueous monoethanol amine absorption solution (6 wt. percent monoethanol amine) and an aromatic hydrocarbon solvent, (6 wt. percent of the hydrocarbon solvent) having the following properties, is circulated to the tower 11 as the absorption solution for absorbing acid gases from an effluent obtained from the pyrolysis of ethane. The hydrocarbon solvent purge is 2 wt. percent of the solvent circulating in the system.

Hydrocarbon Solvent

| | |
|---|---|
| IBP | 350°F. |
| End Point | 500°–550°F. |
| Spec. | .90 |
| Bromine No. | 1.0 (max.) |
| Aromatics Vol.% | 90 (min.) |
| Dienes Vol.% | 0 |
| Sulfur Wt.% | 1.0 (max.) |
| Absorber 11 | |
| Temperature | 90°F. |
| Pressure | 220 psig |
| Regenerator | |
| Temperature | 250°F. |
| Pressure | 10 psig |

The system operates without fouling of the amine regenerator and heat exchange system.

The process of the invention may be employed in acid gas absorption systems employing a wide variety of amine solutions which are generally employed for separating acid gases from gaseous mixtures. As representative examples of such amines, including primary, secondary and tertiary and mon- di- and triamines, there may be mentioned; aliphatic hydrocarbon amines; such as, hexylamine, dipropylamine, propylene diamine, trimethylenediamine, ethylene diamine, triaminopropane, and the like; hydroxy- substituted aliphatic hydrocarbon amines; such as, mono-, di-, and triethanolamine, dihydroxypropylamine, diethylaminoethyl alcohol, and the like; aralkylamines; such as, benzylamine, phenylethylamine, and the like; cycloaliphatic hydrocarbon amines; such as, cyclohexylamine, cyclopentylamine, and the like; etc. These aqueous amine solutions are generally known in the art and the above examples, are not to be considered as limiting the scope of the invention. In accordance with the present invention, the amine solution generally contains from about 5 percent to about 18 percent, by weight of amine, and preferably from about 6 percent to about 8 percent, by weight, of the amine.

The dienes which are generally separated from the aqueous amine solution are those that are produced during a hydrocarbon pyrolysis process; such as, alkadienes; e.g., butadiene, propadiene, pentadiene, etc., and cycloalkadienes; e.g., cyclopentadiene, cyclohexadiene, etc. In the pyrolysis of a hydrocarbon to produce ethylene, the dienes most generally present in the effluent are butadiene, cyclopentadiene and cyclohexadiene. It is to be understood that the above representative examples are not to be considered as limiting the scope of the invention.

The process of the invention is advantageous in that polymerization problems heretofore encountered in the amine regenerator and heat exchange systems are essentially eliminated. In addition, the steps employed for eliminating such problems are easily integrated into existing amine absorption systems. Furthermore, the process is economical in that essentially complete recovery of all components may be effected. The above advantages and numerous other advantages of the invention should be readily apparent from the above description thereof.

Numerous modifications and variations of the invention are possible in light of the above teachings and, therefore, within the scope of the appended claims, the invention may be practised otherwise than as particularly described.

What is claimed is:

1. A process for removing acid gases from a gaseous stream containing acid gases and dienes, comprising:

contacting the gaseous stream in acid gas absorption zone with mixture of a lean aqueous amine acid gas absorption solution and a hydrocarbon solvent essentially free of olefinically unsaturated components, to effect removal of acid gases and dienes therefrom;

recovering rich acid gas absorption solution and hydrocarbon solvent from said acid gas absorption zone, said hydrocarbon solvent containing the dienes; and purging a portion of the hydrocarbon solvent containing the dienes.

2. The process as defined in claim 1 wherein the hydrocarbon solvent introduced with the lean aqueous acid gas absorption solution is present in an amount from about 2 percent to about 10 percent, by weight.

3. The process as defined in claim 2 wherein the hydrocarbon solvent has an initial boiling point of at least 80° C.

4. The process as defined in claim 1 wherein the hydrocarbon solvent is an aromatic hydrocarbon solvent.

5. A process for removing acid gases from a gaseous stream containing acid gases and dienes, comprising:

contacting the gaseous stream in an acid gas absorption tower with a mixture of a lean aqueous amine acid gas absorption solution and a hydrocarbon solvent essentially free of olefinically unsaturated components, to effect removal of acid gases and dienes therefrom;

recovering rich acid gas absorption solution and hydrocarbon solvent from said acid gas absorption zone;

introducing the rich aqueous amine absorption solution and the hydrocarbon solvent into an amine regeneration tower to separate the acid gases from the aqueous amine acid gas absorption solution and recover a lean aqueous amine acid gas absorption solution;

recovering lean aqueous amine acid gas absorption solution and hydrocarbon solvent from the amine regeneration tower;

passing the lean aqueous amine absorption gas solution and hydrocarbon solvent to the acid gas absorption tower; and purging a portion of the hydrocarbon solvent.

6. The process as defined in claim 5 wherein the hydrocarbon solvent introduced with the lean aqueous amine acid gas absorption solution is present in an amount from about 2 percent to about 10 percent, by weight.

7. The process as defined in claim 6 wherein a quiescent zone of liquid is maintained in the bottom of the acid gas absorption tower, said aqueous amine acid gas absorption solution and said hydrocarbon solvent being separately withdrawn from the bottom of the acid gas absorption tower, said purged portion of the hydrocarbon solvent being obtained from the hydrocarbon solvent withdrawn from the acid gas absorption tower, said aqueous amine acid gas absorption solution and hydrocarbon solvent being combined prior to introduction into the amine regeneration tower.

8. The process as defined in claim 7 wherein the portion of hydrocarbon solvent purged comprises from about 1 percent to about 5 percent, by weight, of the hydrocarbon solvent employed.

* * * * *